(12) United States Patent
Tsutsumi et al.

(10) Patent No.: US 9,761,855 B2
(45) Date of Patent: Sep. 12, 2017

(54) WELDING STRUCTURE BETWEEN ELECTRIC STORAGE DEVICE AND BUS BAR AND METHOD FOR WELDING ELECTRIC STORAGE DEVICE AND BUS BAR TOGETHER

(71) Applicant: GS Yuasa International Ltd., Kyoto-shi (JP)

(72) Inventors: Masakazu Tsutsumi, Kyoto (JP); Hideki Matsushima, Wako (JP); Yu Murai, Wako (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 574 days.

(21) Appl. No.: 14/312,375

(22) Filed: Jun. 23, 2014

(65) Prior Publication Data

US 2014/0377625 A1 Dec. 25, 2014

(30) Foreign Application Priority Data

Jun. 25, 2013 (JP) ................................. 2013-133079

(51) Int. Cl.
*H01M 2/28* (2006.01)
*H01M 2/20* (2006.01)
(Continued)

(52) U.S. Cl.
CPC ........... *H01M 2/204* (2013.01); *H01M 2/206* (2013.01); *H01G 11/10* (2013.01); *H01G 11/76* (2013.01); *Y10T 29/49108* (2015.01)

(58) Field of Classification Search
CPC ...... H01M 2/204; H01M 2/206; H01G 11/10; H01G 11/76
See application file for complete search history.

(56) References Cited

U.S. PATENT DOCUMENTS

| 4,321,455 A | * | 3/1982 | Hill | ........................... B23K 9/08 219/121.56 |
| 2008/0160234 A1 | | 7/2008 | Yoshida et al. | |

(Continued)

FOREIGN PATENT DOCUMENTS

| JP | 2008-166031 A | 7/2008 |
| JP | 2011-138765 A | 7/2011 |

(Continued)

*Primary Examiner* — Raymond Alejandro
(74) *Attorney, Agent, or Firm* — McGinn IP Law Group, PLLC.

(57) ABSTRACT

An electric storage apparatus including a welding structure between an electric storage device and a bus bar includes the electric storage device including an external terminal that includes a first connection surface, the bus bar including a second connection surface that overlaps the first connection surface, a first weld portion that is formed extending over the external terminal and the bus bar in a region where the first connection surface and the second connection surface are opposed to each other, and a second weld portion that is formed extending over the external terminal and the bus bar in the region where the first connection surface and the second connection surface are opposed to each other, the second weld portion directly overlapping the first weld portion in a region where the first connection surface and the second connection surface overlap each other.

20 Claims, 12 Drawing Sheets

(51) Int. Cl.
*H01G 11/10* (2013.01)
*H01G 11/76* (2013.01)

(56) References Cited

U.S. PATENT DOCUMENTS

2010/0266889 A1* 10/2010 Kim .................. H01M 2/202
    429/158
2011/0159353 A1    6/2011   Byun et al.
2012/0189904 A1    7/2012   Kawada et al.

FOREIGN PATENT DOCUMENTS

| JP | 2012-043714 A | 3/2012 |
| JP | 2012-45570 A | 3/2012 |
| JP | 2012-125829 A | 7/2012 |
| JP | 2012-169255 A | 9/2012 |
| JP | 5067190 B2 | 11/2012 |

* cited by examiner

F I G . 5
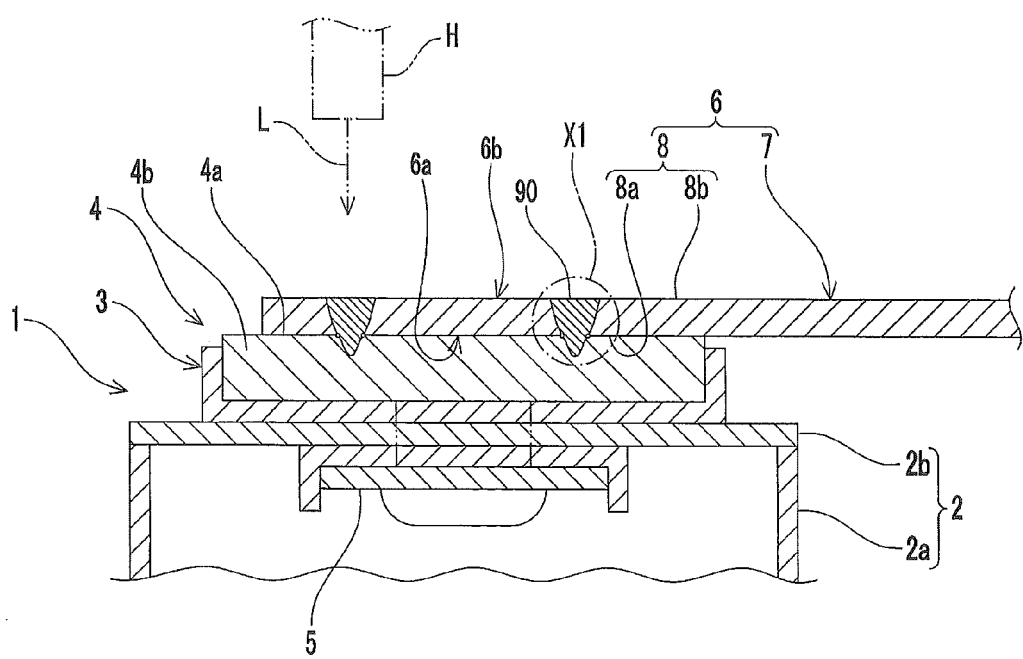

F I G . 12
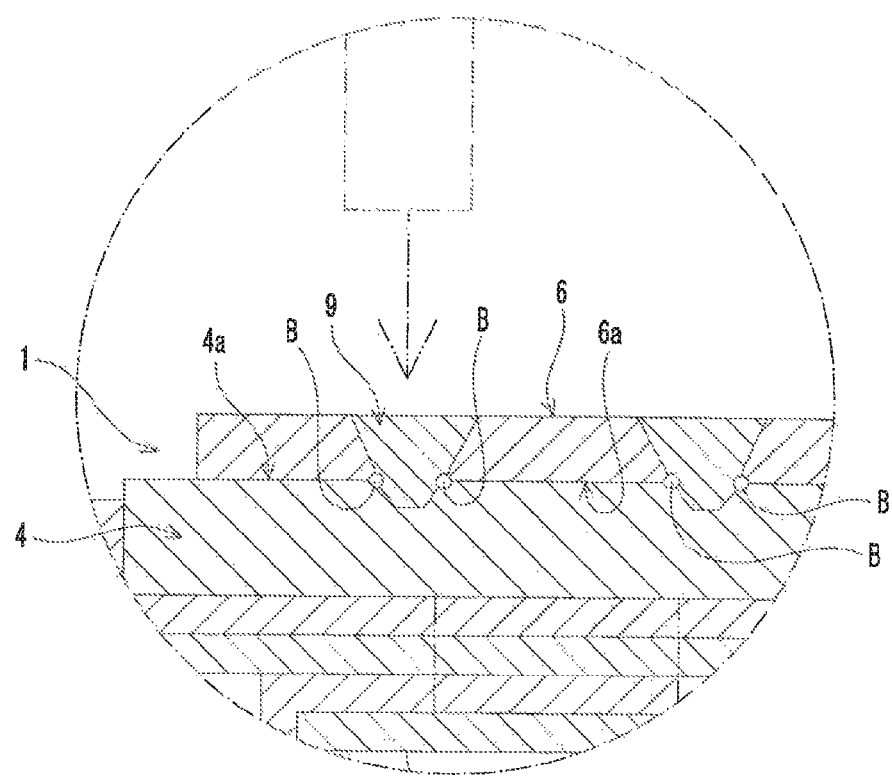
Prior Art

WELDING STRUCTURE BETWEEN ELECTRIC STORAGE DEVICE AND BUS BAR AND METHOD FOR WELDING ELECTRIC STORAGE DEVICE AND BUS BAR TOGETHER

CROSS-REFERENCE TO RELATED APPLICATION

This application claims the benefit of Japanese Patent Application No. 2013-133079, filed on Jun. 25, 2013, which is incorporated herein by reference.

FIELD

The present invention relates to an electric storage apparatus including a bus bar and an electric storage device having an external terminal, and a method for producing the electric storage apparatus.

BACKGROUND

Generally, an electric storage apparatus includes an electric storage device 1 that includes an external terminal 4, and a bus bar 6 that is connected electrically to the external terminal 4, as shown in FIG. 12. In some electric storage apparatuses of this type, the external terminal 4 of the electric storage device (battery cell) 1 and the bus bar 6 are connected to each other by welding.

In such an electric storage apparatus, the external terminal 4 has a flat first connection surface 4a. Meanwhile, the bus bar 6 has a flat second connection surface 6a which overlaps the first connection surface 4a. The external terminal 4 and the bus bar 6 are welded together in a state where the first connection surface 4a and the second connection surface 6a overlap each other. That is, a weld portion 9 in which the external terminal 4 and the bus bar 6 are partially melted and fused is formed in a region where the first connection surface 4a and the second connection surface 6a are opposed to each other. This allows the electric storage device 1 and the bus bar 6 to be conductively connected to each other (for example, see JP 2012-125829 A).

In the aforementioned electric storage device 1, the weld portion 9 is formed. Following this, there are cases where hollow blowholes B occur in the periphery of the weld portion 9. When the blowholes B occur, the width of the junction between the external terminal 4 and the bus bar 6 is narrowed. Therefore, the strength of the weld portion 9 is reduced as compared to the case where no blowholes B occur.

Further, for example, when the electric storage device 1 or the bus bar 6 vibrates, or the bus bar 6 is bent for position adjustment, stress is concentrated in the periphery of the weld portion 9. In such a case, the stress concentrated in the periphery of the weld portion 9 may possibly cause damage in part of the weld portion 9 when the weld strength is reduced due to the influence of the blowholes B. Therefore, there is a possibility of failure to ensure the stiffness of the connection between the external terminal 4 and the bus bar 6.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention aims to provide an electric storage apparatus and a method for producing the electric storage apparatus which are capable of suppressing a reduction in the strength of a welded portion due to the influence of blowholes.

According to an aspect of the present invention, an electric storage apparatus includes: an electric storage device including an external terminal that has a first connection surface; a bus bar having a second connection surface that overlaps the first connection surface; a first weld portion that is formed extending over the external terminal and the bus bar in a region where the first connection surface and the second connection surface are opposed to each other; and a second weld portion that is formed extending over the external terminal and the bus bar in a region where the first connection surface and the second connection surface are opposed to each other, the second weld portion overlapping the first weld portion, wherein the second weld portion is formed such that its weld center is displaced from a weld center of the first weld portion.

BRIEF DESCRIPTION OF DRAWINGS

The foregoing and other features of the present invention will become apparent from the following description and drawings of an illustrative embodiment of the invention in which:

FIG. 5 is an explanatory diagram illustrating a state where a bus bar is welded to an external terminal, and a first weld portion is formed;

FIG. 12 is an enlarged view illustrating a main part of a weld portion that is formed in an external terminal and a bus bar when a first connection surface of the external terminal and a second connection surface of the bus bar are welded while overlapping each other, in a conventional art.

DESCRIPTION OF EMBODIMENTS

Figure 1:
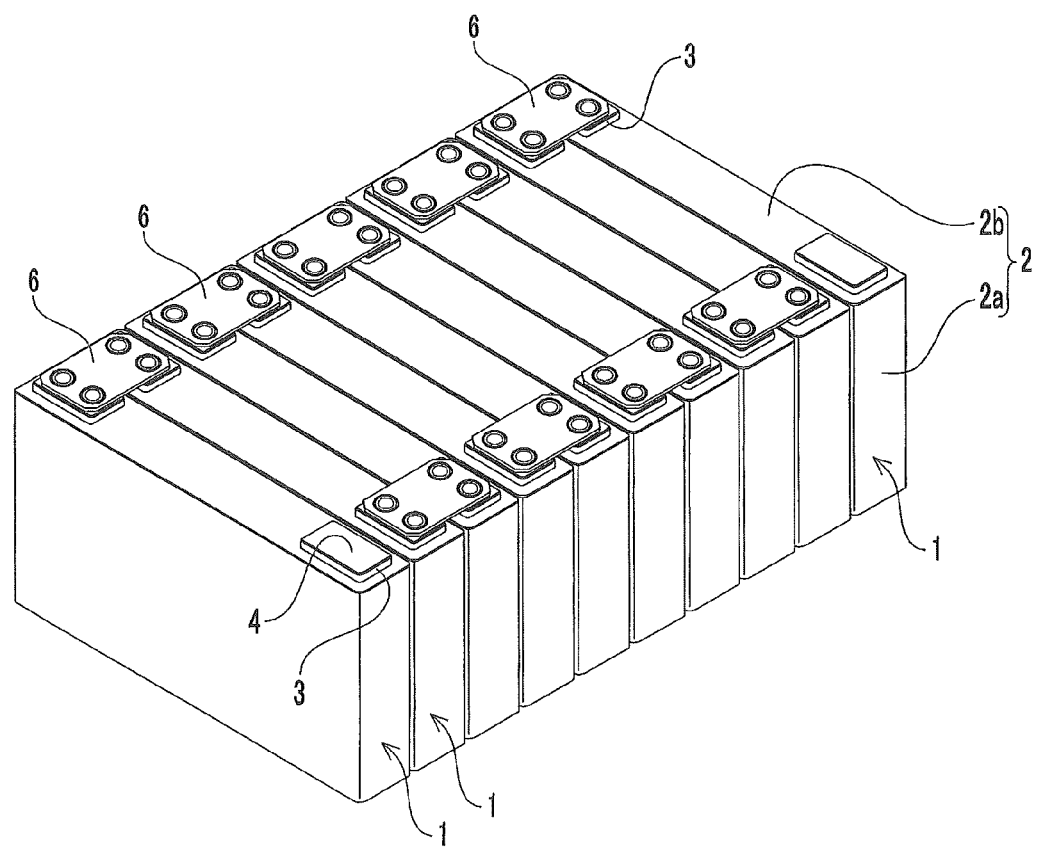
FIG. 1 is an overall perspective view of a battery module according to an embodiment of the present invention.

According to an aspect of this embodiment, an electric storage apparatus includes: an electric storage device including an external terminal that has a first connection surface; a bus bar having a second connection surface that overlaps the first connection surface; a first weld portion that is formed extending over the external terminal and the bus bar in a region where the first connection surface and the second connection surface are opposed to each other; and a second weld portion that is formed extending over the external terminal and the bus bar in a region where the first connection surface and the second connection surface are opposed to each other, the second weld portion overlapping the first weld portion, wherein the second weld portion is formed so that its weld center is displaced from a weld center of the first weld portion.

According to such a configuration, the second weld portion is formed so that its weld center is displaced from the weld center of the first weld portion. Therefore, even if blowholes occur following the formation of the first weld portion, the blowholes are eliminated by forming the second weld portion.

Further, the second weld portion is formed in a portion where blowholes are made less likely to occur because the first weld portion has been formed. Therefore, it is also possible to suppress the occurrence of blowholes in the second weld portion.

According to an aspect of this embodiment, the electric storage apparatus may have a configuration in which the second weld portion is formed so that its penetration depth is smaller than a penetration depth of the first weld portion.

According to such a configuration, the second weld portion is formed with an energy lower than the energy for forming the first weld portion. Therefore, it is possible to prevent the air tightness of the electric storage apparatus from being reduced due to heat generated during the formation of the second weld portion.

According to an aspect of this embodiment, the electric storage apparatus may have a configuration in which the first weld portion is formed to have an elliptical ring shape or a circular ring shape.

According to such a configuration, even if external forces act on the bus bar in various directions, it is possible to suppress stress concentration on the weld portion. Accordingly, it is possible to increase the strength of the weld portion.

In this case, the second weld portion may be formed so that its weld center is displaced from the weld center of the first weld portion outwardly in the radial direction of the first weld portion.

According to such a configuration, the second weld portion is formed to overlap the first weld portion. Therefore, even if blowholes occur following the formation of the first weld portion, it is possible to eliminate the blowholes by forming the second weld portion.

According to an aspect of this embodiment, the electric storage apparatus may have a configuration in which: the bus bar has a connection portion that includes the second connection surface, and a body that is continuous with the connection portion; and the second weld portion is formed to overlap a portion of the first weld portion on the body side of the bus bar.

According to such a configuration, even if blowholes occur, following the formation of the first weld portion, in a portion to which external forces acting on the bus bar are easily transferred, it is possible to eliminate the blowholes by welding the second weld portion. Accordingly, it is possible to efficiently prevent impairment of the strength of the weld portion.

According to an aspect of this embodiment, the electric storage apparatus may have a configuration in which the second weld portion is formed so that its weld center is displaced in a direction intersecting a direction in which the first weld portion extends.

According to such a configuration, the second weld portion is formed to overlap the first weld portion. Therefore, even if blowholes occur following the formation of the first weld portion, it is possible to eliminate the blowholes by forming the second weld portion.

A method for producing an electric storage apparatus according to an aspect of this embodiment includes: overlapping a first connection surface of an external terminal included in an electric storage device with a second connection surface of a bus bar; forming a first weld portion in which the external terminal and the bus bar are partially melted and fused, in a region where the first connection surface and the second connection surface are opposed to each other; and forming a second weld portion in which the external terminal and the bus bar are melted and fused, in a region where the first connection surface and the second connection surface are opposed to each other, and in a region overlapping the first weld portion, so that a weld center of the second weld portion is displaced from a weld center of the first weld portion.

According to such a configuration, the second weld portion is formed in a region overlapping the first weld portion. Further, the second weld portion is formed so that the weld center of the second weld portion is displaced from the weld center of the first weld portion. Therefore, even if blowholes occur following the formation of the first weld portion, it is possible to eliminate the blowholes by forming the second weld portion.

Further, the second weld portion is formed in a portion where blowholes are made less likely to occur because the first weld portion has been formed. Therefore, it is also possible to suppress the occurrence of blowholes following the formation of the second weld portion.

In the method for producing an electric storage apparatus according to an aspect of this embodiment, in forming the second weld portion, the penetration depth of the second weld portion may be smaller than the penetration depth of the first weld portion.

According to such a configuration, the second weld portion is formed with an energy lower than the energy for forming the first weld portion. Therefore, it is possible to prevent the air tightness of the electric storage apparatus from being reduced due to heat generated during the formation of the second weld portion.

In the method for producing an electric storage apparatus according to an aspect of this embodiment, in forming the first weld portion, the first weld portion may be formed to have an elliptical ring shape or a circular ring shape.

According to such a configuration, even if external forces act on the bus bar in various directions, it is possible to suppress stress concentration on the weld portion. Accordingly, it is possible to increase the strength of the weld portion.

In the method for producing an electric storage apparatus according to an aspect of this embodiment, in forming the second weld portion, the second weld portion may be formed at a position displaced outwardly in the radial direction of the first weld portion.

According to such a configuration, the second weld portion is formed to overlap the first weld portion. Therefore, even if blowholes occur following the welding of the first weld portion, it is possible to eliminate the blowholes by welding the second weld portion.

The method for producing an electric storage apparatus according to an aspect of this embodiment may be configured so that: the bus bar has a connection portion that includes the second connection surface, and a body that is continuous with the connection portion; and in forming the second weld portion, the second weld portion is formed to overlap a portion of the first weld portion on the body side of the bus bar.

According to such a configuration, even if blowholes occur, following the welding of the first weld portion, in a portion to which external forces acting on the bus bar are easily transferred, it is possible to eliminate the blowholes by welding the second weld portion. Accordingly, it is possible to prevent impairment of the strength of the weld portion.

In the method for producing an electric storage apparatus according to an aspect of this embodiment, in forming the second weld portion, the second weld portion may be formed at a position displaced in a direction intersecting a direction in which the first weld portion extends.

According to such a configuration, the second weld portion is formed to overlap the first weld portion. Therefore, even if blowholes occur following the welding of the first weld portion, it is possible to eliminate the blowholes by welding the second weld portion.

As described above, the electric storage apparatus and the method for producing the electric storage apparatus according to an aspect of this embodiment exerts an excellent effect of suppressing the strength of a welded portion from being reduced due to the influence of blowholes.

Figure 2:
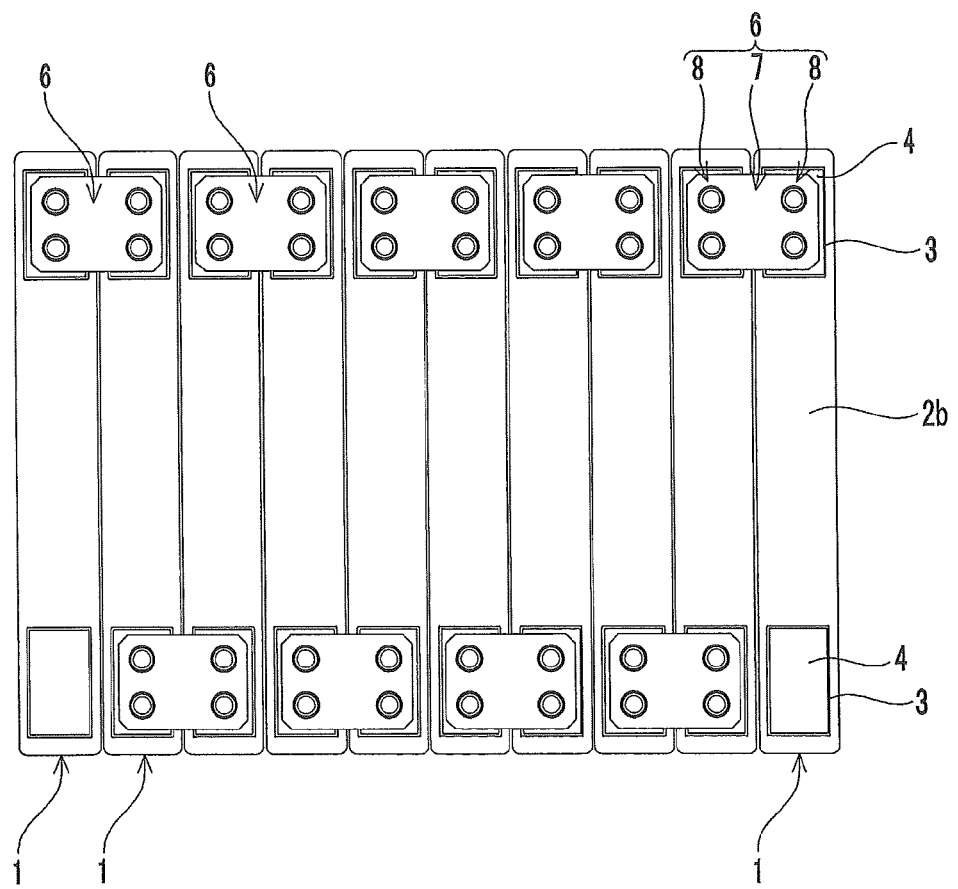
FIG. 2 is a plan view of the battery module according to the aforementioned embodiment.
Figure 3:
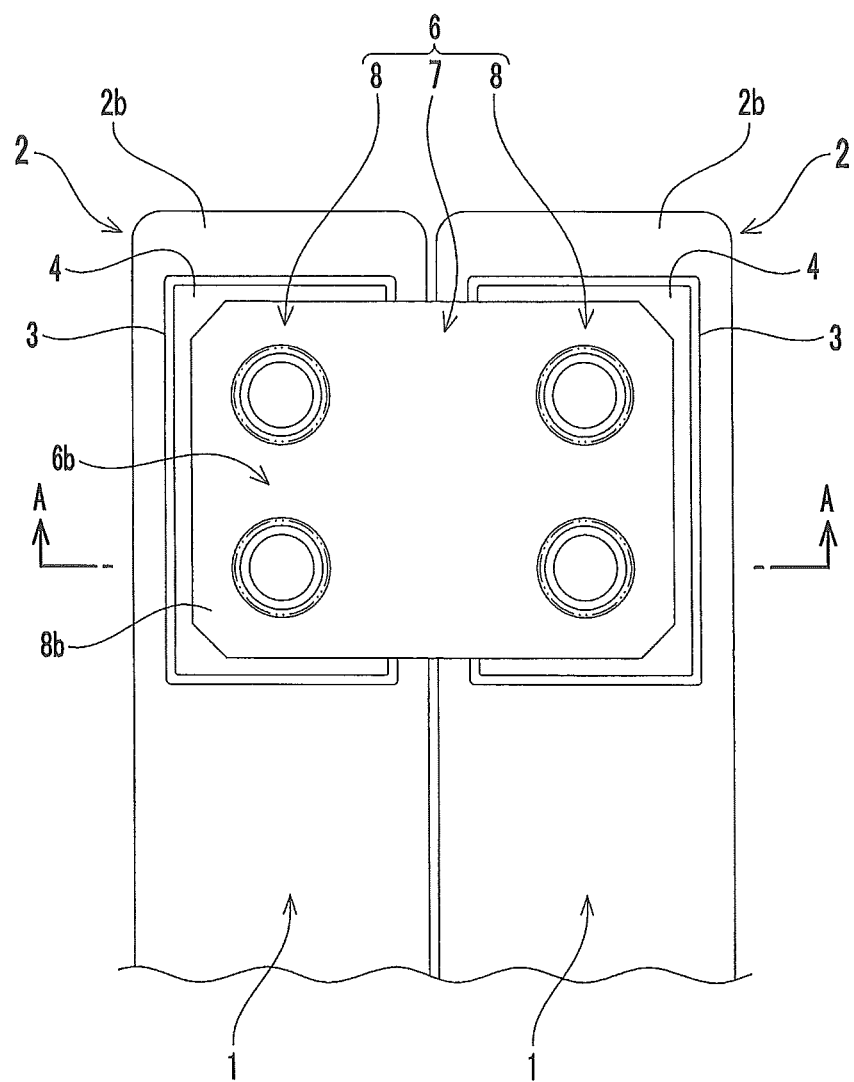
FIG. 3 is an enlarged plan view of a part of the battery module according to the aforementioned embodiment.

Hereinafter, a battery module as an embodiment of the electric storage apparatus according to an aspect of the present invention is described with reference to the drawings. As shown in FIG. 1 to FIG. 3, the battery module according to an aspect of this embodiment includes a plurality of battery cells 1 (electric storage devices) and a plurality of bus bars 6. The bus bars 6 are electrically connected to the battery cells 1.

All the plurality of the battery cells 1 have the same shape and the same structure. According to this supposition, a structure of one battery cell 1 is described below.

The battery cell 1 has an electrode assembly (not shown) and a case 2 that houses the electrode assembly. As shown in FIG. 3, the battery cell 1 has an outer gasket 3 arranged on an outer surface of the case 2 and an external terminal 4 mounted on the outer gasket 3. The battery cell 1 has a current collector 5 electrically connected to the external terminal 4 (see FIG. 4).

In the battery cell 1 according to an aspect of this embodiment, a pair of outer gaskets 3 are arranged on the outer surface of the case 2, as shown in FIG. 2. In the battery cell 1, one external terminal 4 is mounted on each of the pair of outer gaskets 3. That is, the battery cell 1 has a pair of outer gaskets 3 and a pair of external terminals 4.

Figure 4:
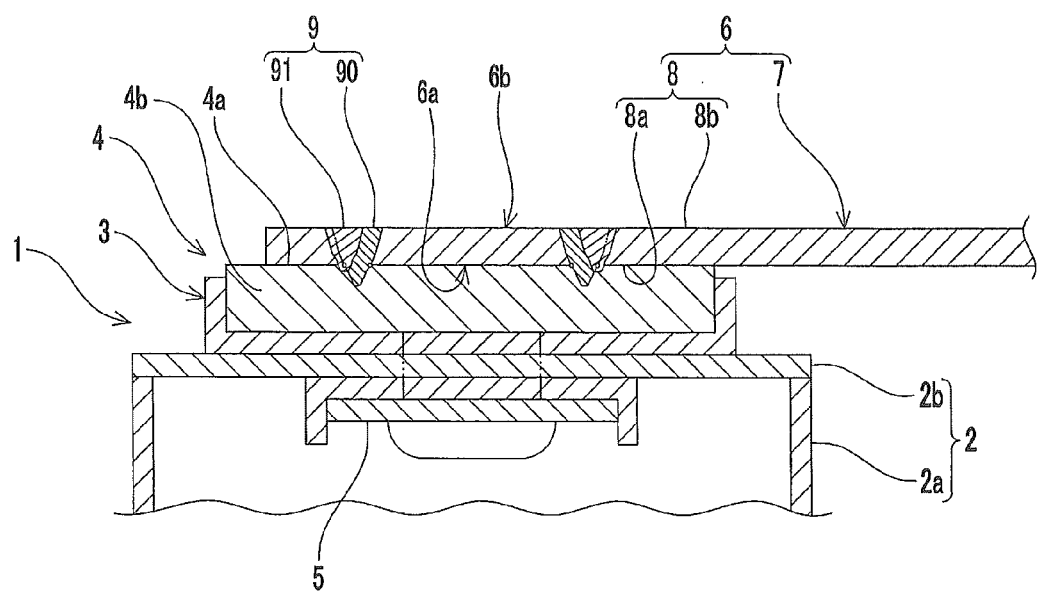
FIG. 4 is a sectional view taken along the line A-A of FIG. 3.

As shown in FIG. 4, the case 2 has a case body 2a having an opening and a cover plate 2b that closes and seals the opening of the case body 2a.

As shown in FIG. 2, the case body 2a is formed to have a bottomed rectangular tubular shape that is flattened in the width direction. Accordingly, the cover plate 2b is formed to have a rectangular shape corresponding to the shape of the opening of the case body 2a.

A pair of through holes (not shown) are formed in the cover plate 2b. One through hole is formed at one end of the cover plate 2b in the longitudinal direction. The other through hole is formed at the other end of the cover plate 2b in the longitudinal direction.

Each of the outer gaskets 3 is made of an insulating material such as resin. As shown in FIG. 4, a through hole (not shown) is formed in the outer gasket 3. The outer gasket 3 is arranged on the outer surface of the cover plate 2b. A more detailed description is given. One of the outer gaskets 3 is arranged so that the position of the through hole of the outer gasket 3 corresponds to the position of one of the through holes of the cover plate 2b. The other of the outer gaskets 3 is arranged so that the position of the through hole of the outer gasket 3 corresponds to the position of the other of the through holes of the cover plate 2b.

As shown in FIG. 2, each of the outer gaskets 3 is formed to have a rectangular shape (rectangular shape that is elongated in the longitudinal direction of the cover plate 2b) in plan view.

One of the pair of external terminals 4 is used for the positive electrode, and the other of the external terminals 4 is used for the negative electrode. The external terminal 4 for the positive electrode (on one side) is arranged at one end of the cover plate 2b in the longitudinal direction. The external terminal 4 for the negative electrode (on the other side) is arranged at the other end of the cover plate 2b in the longitudinal direction. As shown in FIG. 4, each of the external terminals 4 has a first connection surface 4a to which a bus bar 6 (a second connection surface 6a of the bus bar 6, which will be described below) is connected.

A more detailed description is given. One of the external terminals 4 has a plate portion 4b that is mounted on the outer gasket 3 (one of the outer gaskets 3). The plate portion 4b is made of aluminum or an aluminum-based metal material such as aluminum alloy. The plate portion 4b is formed to have a rectangular shape (rectangular shape that is elongated in the longitudinal direction of the cover plate 2b) in plan view. The plate portion 4b has a flat first surface to which the bus bar 6 is connected and a second surface on the opposite side of the first surface. Therefore, the first surface of the plate portion 4b forms a first connection surface 4a of the one of the external terminals 4.

The one of the external terminals 4 further has a crimp portion (not numbered) for attaching the plate portion 4b to the outer surface of the case 2 (the cover plate 2b). The crimp portion extends from the second surface of the plate portion 4b. The crimp portion is made of aluminum or an aluminum-based metal material such as aluminum alloy. In the one of the external terminals 4, the crimp portion is crimped in a state of being inserted through the through hole of the cover plate 2b, the through hole of the outer gasket 3, and the through hole of the current collector 5. The crimp portion is electrically connected to the current collector 5.

The other of the external terminals 4 has a plate portion 4b that is mounted on the outer gasket 3 (the other outer gasket 3). The plate portion 4b is made of aluminum or an aluminum-based metal material such as aluminum alloy. The plate portion 4b is formed to have a rectangular shape (rectangular shape that is elongated in the longitudinal direction of the cover plate 2b) in plan view. The plate portion 4b has a first surface to which a bus bar 6 is connected and a second surface on the opposite side of the first surface. Therefore, the first surface of the plate portion 4b forms a first connection surface 4a of the other of the external terminals 4.

The other of the external terminals 4 further has a crimp portion (not numbered) for attaching the plate portion 4b to the outer surface of the case 2 (the cover plate 2b). The crimp portion is made of copper or a copper-based metal material such as copper alloy. In the other of the external terminals 4, the crimp portion is crimped in a state of being inserted through the through hole of the plate portion 4b, the through hole of the cover plate 2b, the through hole of the outer gasket 3, and the through hole of the current collector 5. The crimp portion is electrically connected to the current collector 5.

The first connection surface 4a of the one of the external terminals 4 and the first connection surface 4a of the other of the external terminals 4 are located above the outer gasket 3. The first connection surface 4a of the one of the external terminals 4 and the first connection surface 4a of the other of the external terminals 4 are located on the same height level from the outer surface of the cover plate 2b.

Returning to FIG. 1 and FIG. 2, arrangement of the plurality of battery cells 1 in the battery module is described. The plurality of battery cells 1 are aligned in a row. The plurality of battery cells 1 are lined up in the short direction of the cover plate 2b. In this embodiment, ten battery cells 1 are aligned. In the following description, the short direction of the cover plate 2b is defined as the alignment direction.

A pair of adjacent battery cells 1 are arranged so that adjacent external terminals 4 in the alignment direction have opposite polarities. The adjacent external terminals 4 in the alignment direction are connected to each other by a bus bar 6. More specifically, in the adjacent battery cells 1, the first connection surface 4a of the external terminal 4 for the positive electrode of one of the battery cells 1 and the first connection surface 4a of the external terminal 4 for the negative electrode of the other of the battery cells 1 are closely arranged. These external terminals 4 are connected to each other by the bus bar 6. In this way, the battery cells 1 are connected in series, thereby constituting one battery as a whole.

Of the plurality of battery cells 1 that are connected in series, bus bars (not shown) for external connection are connected respectively to one of the external terminals 4 of the battery cell 1 located at one end, and one of the external terminals 4 of the battery cell 1 located at the other end. These bus bars are connected to other battery modules or equipment.

Next, the bus bars 6 are described. In this embodiment, all the bus bars 6 that connect the external terminals 4 to one another have the same shape and the same structure. According to this supposition, a structure of one bus bar 6 is described below.

As shown in FIG. 3, the bus bar 6 is formed to have a rectangular flat plate shape in plan view. The bus bar 6 is formed of a plate member made of aluminum or an aluminum-based metal material such as aluminum alloy. As shown in FIG. 4, the bus bar 6 has a second connection surface 6a that overlaps the first connection surface 4a. The bus bar 6 has a weld surface 6b on the opposite side of the second connection surface 6a.

A more detailed description is given. The bus bar 6 has a body 7 and connection portions 8 (a pair of connection portions 8 in this embodiment) that are continuous with both ends of the body 7. The body 7 is continuous with the connection portions 8. More specifically, the body 7 is formed integrally with the pair of connection portions 8.

The connection portions 8 are connected respectively to the external terminals 4 of different electric storage devices 1. Each of the connection portions 8 has a first surface 8a that overlaps the first connection surface 4a, and a second surface 8b on the opposite side of the first surface 8a.

Therefore, the first surface 8a of the connection portion 8 is included in the second connection surface 6a of the bus bar 6, and the second surface 8b of the connection portion 8 is included in the weld surface 6b of the bus bar 6.

In an electric storage apparatus, the external terminals 4 and the bus bars 6 are connected by welding (laser welding in this embodiment), as described above. Therefore, the electric storage apparatus includes a first weld portion 90 that is formed over the external terminal 4 and the bus bar 6 in a region where the first connection surface 4a and the second connection surface 6a are opposed to each other, and a second weld portion 91 that is formed over the external terminal 4 and the bus bar 6 in a region where the first connection surface 4a and the second connection surface 6a are opposed to each other and that overlaps the first weld portion 90. In the following description, a welded portion (the first weld portion 90 and the second weld portion 91 in this embodiment) may be referred to as the weld portion 9.

The first weld portion 90 is formed to have a circular ring shape in plan view. The first weld portion 90 is formed extending from the weld surface 6b of the bus bar 6 over the first connection surface 4a of the external terminal 4. The sectional area of the first weld portion 90 is reduced from the weld surface 6b toward the first connection surface 4a. That is, the first weld portion 90 is formed to have a cross section in its thickness direction of an inverted triangular shape or an inverted trapezoid shape.

The second weld portion 91 is formed to have a circular ring shape in plan view. The second weld portion 91 is formed from the weld surface 6b of the bus bar 6 over the first connection surface 4a of the external terminal 4.

The second weld portion 91 is formed to have a smaller penetration depth than the first weld portion 90. The sectional area of the second weld portion 91 is reduced from the weld surface 6b toward the first connection surface 4a. That is, the second weld portion 91 is formed to have a cross section in its thickness direction of an inverted triangular shape or an inverted trapezoid shape.

Further, the second weld portion 91 is formed so that its weld center is displaced from the weld center of the first weld portion 90 outwardly in the radial direction. More specifically, the weld center of the second weld portion 91 is formed in a portion that is located at a distance equivalent to half of the junction width of the first weld portion 90 and that is displaced from the weld center of the first weld portion 90 outwardly in the radial direction. Therefore, the second weld portion 91 is formed to overlap an outer edge of the first weld portion 90.

The electric storage apparatus according to an aspect of this embodiment is as described above. Subsequently, a method for producing a battery module is described with reference to the attached drawings.

First, a plurality of battery cells 1 are arranged in parallel, in the same manner as in a finished state, on a conveying apparatus such as a belt conveyor. With such a state, the plurality of battery cells 1 are conveyed to an operating region (hereinafter, referred to as a welding area) of a welding apparatus by the conveying apparatus. In this embodiment, the welding apparatus is a laser welding apparatus. Upon arrival of the plurality of battery cells 1 at the welding area, an automatic bus bar-mounting apparatus, which is arranged next to the welding apparatus, receives a bus bar 6 with a holding member that is capable of holding the bus bar 6. Then, the automatic bus bar-mounting apparatus places the bus bar 6 so that the bus bar 6 straddles a pair of external terminals 4 of adjacent battery cells 1, as shown in FIG. 1 and FIG. 2.

Figure 6:
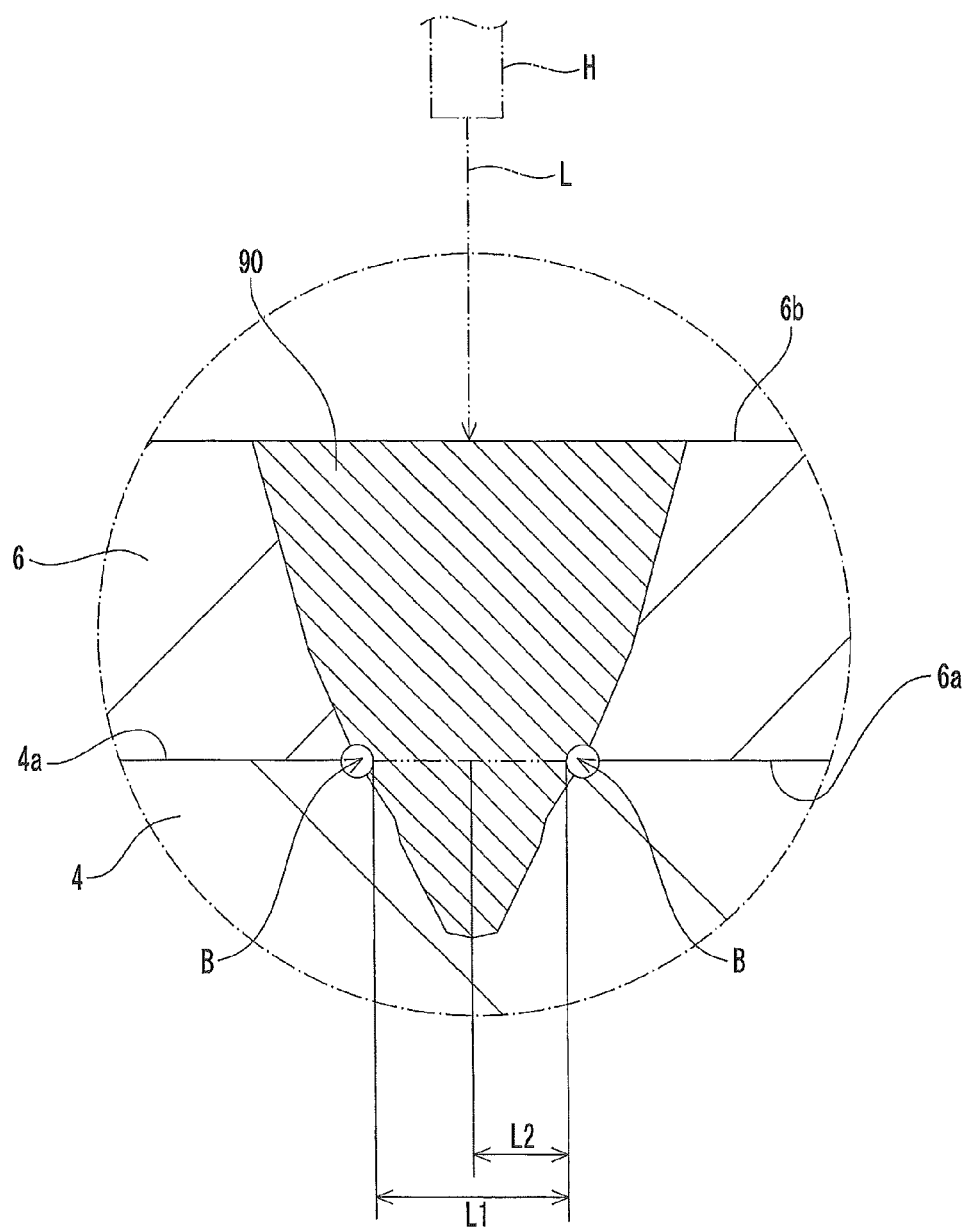
FIG. 6 is an enlarged view of a region X1 shown in FIG. 5, after the formation of the first weld portion.

Subsequently, as shown in FIG. 5, in a state where the holding member presses the bus bar 6 against the external terminal 4, a welding head H emits a laser beam L. Thus, a first weld portion 90 in which the external terminal 4 and the bus bar 6 are partially melted and fused is formed in a region where the first connection surface 4a and the second connection surface 6a are opposed to each other (first welding step). Further, in the first welding step, the first weld portion 90 is formed to have a circular ring shape (see FIG. 3). At this time, blowholes B are formed in the first weld portion 90, as shown in FIG. 6.

Figure 7:
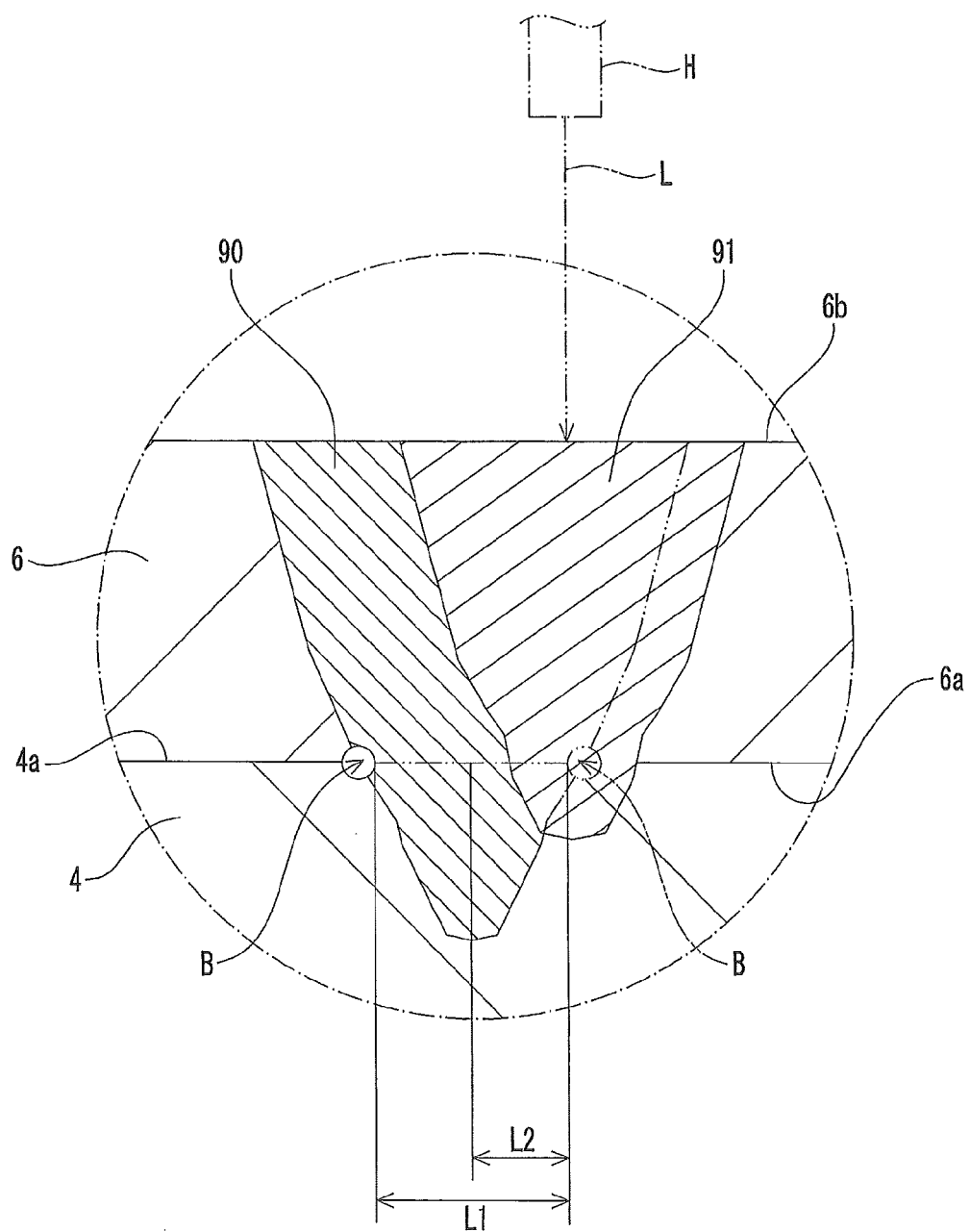
FIG. 7 is an enlarged view of the region X1 shown in FIG. 5, after the formation of a second weld portion.

Further, as shown in FIG. 7, the welding apparatus forms a second weld portion 91 in a region overlapping the first weld portion 90 (second welding step). The second weld portion 91 is a weld portion in which the external terminal 4 and the bus bar 6 are melted and fused in a region where the first connection surface 4a and the second connection surface 6a are opposed to each other. In this regard, the second weld portion 91 is formed so that the weld center of the second weld portion 91 is displaced from the weld center of the first weld portion 90, in the second welding step.

More specifically, in the second welding step, the second weld portion 91 is formed at a position displaced outwardly in the radial direction of the first weld portion 90 (in this embodiment, at a position that is located at a distance L2 equivalent to half of a junction width L1 of the first weld portion 90 and that is displaced outwardly in the radial direction of the first weld portion 90). Thus, the second weld portion 91 is formed so that its weld center is located on an outer circumferential edge of the first weld portion 90 or in the vicinity of the outer circumferential edge of the first weld portion 90.

Of the blowholes B that have been formed in the first weld portion 90, those present in a region where the second weld portion 91 is formed are eliminated by forming the second weld portion 91.

Further, in the second welding step, the welding apparatus forms the second weld portion 91 so that the penetration depth of the second weld portion 91 is smaller than the penetration depth of the first weld portion 90. In this embodiment, the laser output for forming the second weld portion 91 is set smaller than the laser output for forming the first weld portion 90. In this way, the degree to which the second weld portion 91 is melted and fused is adjusted.

Thus, the first weld portion 90 and the second weld portion 91 are formed in the external terminal 4 and the bus bar 6, so that the external terminal 4 and the bus bar 6 are joined to each other. Accordingly, the bus bar 6 is connected electrically and mechanically to the external terminal 4 of the battery cell 1. In this way, a high-capacity battery (battery module) is achieved.

As described above, in the electric storage apparatus according to an aspect of this embodiment, the second weld portion 91 is formed so that its weld center is displaced from the weld center of the first weld portion 90 (in this embodiment, it is displaced outwardly in the radial direction of the first weld portion 90). Therefore, even if blowholes B occur following the formation of the first weld portion 90, the blowholes B are eliminated by forming the second weld portion 91.

The second weld portion 91 is formed in a portion where blowholes B are made less likely to occur because the first weld portion 90 has been formed. Therefore, it is also possible to suppress the occurrence of blowholes B in the second weld portion 91.

Accordingly, the electric storage apparatus according to an aspect of this embodiment exerts an excellent effect of suppressing the strength of the weld portion 9 from being reduced due to the influence of the blowholes B.

The second weld portion 91 is formed so that its penetration depth is smaller than the penetration depth of the first weld portion 90. Therefore, the second weld portion 91 is formed with an energy lower than the energy for forming the first weld portion 90. Accordingly, it is possible to prevent the air tightness of the electric storage apparatus from being reduced due to heat generated during the formation of the second weld portion 91. More specifically, it is possible to prevent the air tightness of the electric storage apparatus from being reduced due to a change in compressive force acting on the outer gasket 3 which is caused by the influence of heat generated during the formation of the second weld portion 91.

The first weld portion 90 is formed to have a circular ring shape. Therefore, even if external forces act on the bus bar 6 in various directions, it is possible to suppress stress concentration on the weld portion 9. Further, it is also possible to increase the strength of the weld portion 9 by increasing the weld length.

The second weld portion 91 is formed to overlap an outer edge of the first weld portion 90. Therefore, even if blowholes B occur, following the formation of the first weld portion 90, in a portion (portion of the first weld portion 90 on the body 7 side of the bus bar 6) to which external forces acting on the bus bar 6 are easily transferred, it is possible to eliminate the blowholes B by welding the second weld portion 91. Accordingly, it is possible to efficiently prevent impairment of the strength of the weld portion 9.

Further, the second weld portion 91 is formed so that its weld center is displaced from the weld center of the first weld portion 90 outwardly in the radial direction, thereby allowing an increase in width (weld width) of the welded portion. This can improve the strength of the weld portion 9.

In the method for producing an electric storage apparatus according to an aspect of this embodiment, the second weld portion 91 is formed in a region overlapping the first weld portion 90. Further, the second weld portion 91 is formed in a state where the weld center of the second weld portion 91 is displaced from the weld center of the first weld portion 90 (in this embodiment, in a state of being displaced outwardly in the radial direction of the first weld portion 90). Therefore, even if blowholes B occur following the formation of the first weld portion 90, it is possible to eliminate the blowholes B by forming the second weld portion 91.

Further, the second weld portion 91 is formed in a portion where blowholes B are made less likely to occur because the first weld portion 90 has been formed. Therefore, it is also possible to suppress the occurrence of blowholes B following the formation of the second weld portion 91.

Accordingly, the method for producing an electric storage apparatus according to an aspect of this embodiment exerts an excellent effect of suppressing the strength of the weld portion 9 from being reduced due to the influence of the blowholes B.

Further, in the second welding step, the penetration depth of the second weld portion 91 is set smaller than the penetration depth of the first weld portion 90. Therefore, the second weld portion 91 can be formed with an energy lower than the energy for forming the first weld portion 90. Therefore, it is possible to prevent the air tightness of the electric storage apparatus from being reduced due to heat generated during the formation of the second weld portion 91. More specifically, it is possible to prevent the air tightness of the electric storage apparatus from being reduced due to a change in compressive force acting on the outer gasket 3 which is caused by the influence of heat generated during the formation of the second weld portion 91.

In the second welding step, the second weld portion 91 is formed to overlap an outer edge of the first weld portion 90. Therefore, even if blowholes B occur, following the welding of the first weld portion 90, in a portion to which external forces acting on the bus bar 6 are easily transferred, it is possible to eliminate the blowholes B by welding the second weld portion 91. Accordingly, it is possible to efficiently prevent impairment of the strength of the weld portion 9.

The electric storage apparatus and the method for producing the electric storage apparatus according to some aspects of the present embodiments are as described above. However, the present invention is not limited to the above described embodiments, and the design can be appropriately modified within the scope intended by the present invention. The operational advantage of the present invention is also not limited to the foregoing embodiments.

That is, the embodiments disclosed herein should be construed in all respects as illustrative but not limiting. The scope of the present invention is not indicated by the foregoing description but by the scope of the claims. Further, the scope of the present invention is intended to include all the modifications equivalent in the sense and the scope to the scope of the claims.

For example, it is also possible to employ rectangular batteries having a rectangular appearance or cylindrical batteries having a cylindrical appearance as the battery cells 1, though not particularly mentioned in the above described embodiments.

Figure 8:
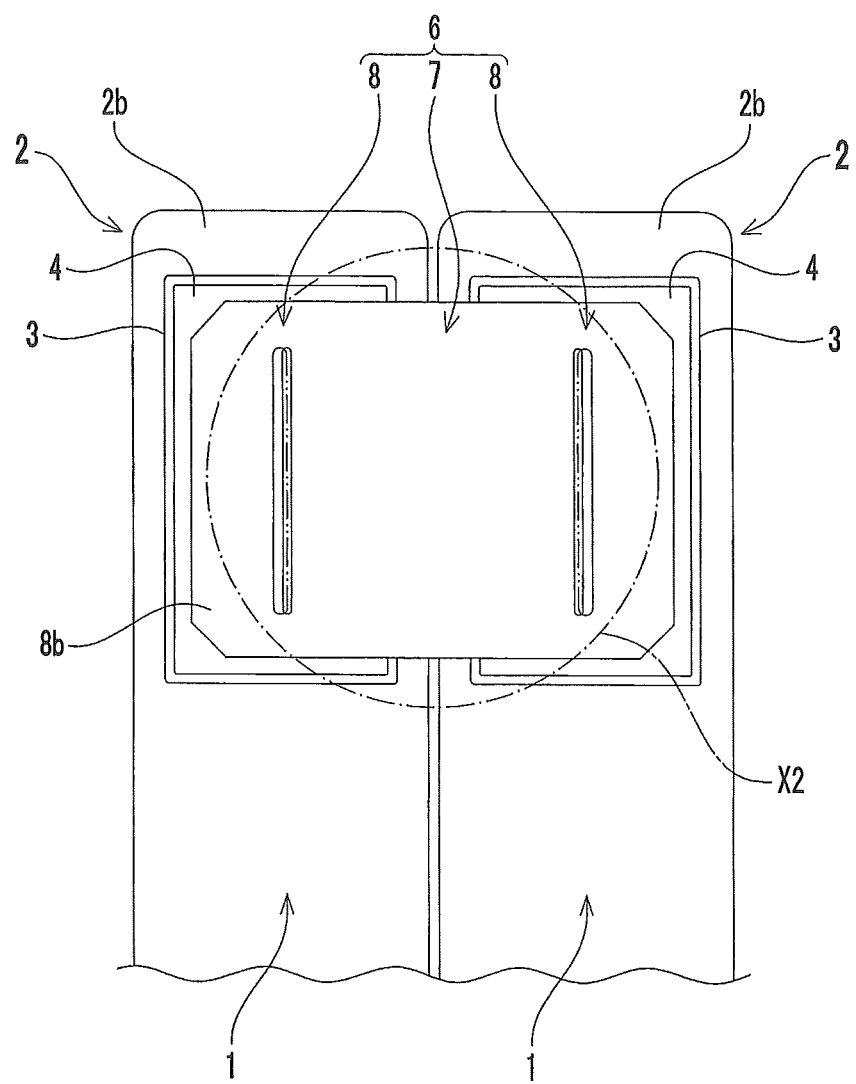
FIG. 8 is an enlarged plan view of a part of a battery module according to another embodiment of the present invention.
Figure 9:
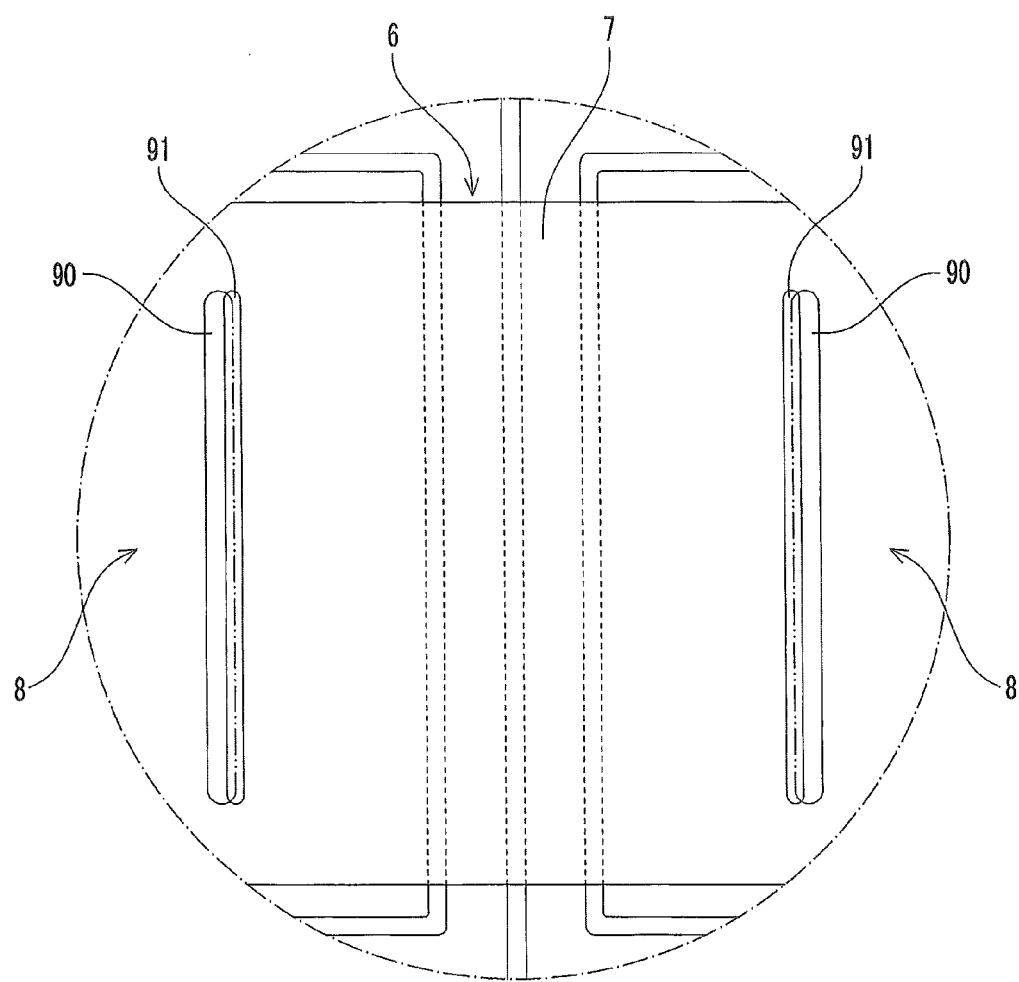
FIG. 9 is an enlarged view of a region X2 shown in FIG. 8.

In the above described embodiments, the first weld portion 90 is formed to have a circular ring shape. However, there is no limitation to this. For example, the first weld portion 90 may be formed to have an elliptical ring shape, or may be formed to have a linear shape, as shown in FIG. 8 and FIG. 9.

In the case where the first weld portion 90 is formed to have a linear shape, it is preferable that the second weld portion 91 be formed to overlap a portion of the first weld portion 90 on the body 7 side of the bus bar 6. This makes it possible to eliminate the blowholes B that have occurred in the weld portion 9 on the body 7 side of the bus bar 6. Accordingly, it is possible to suppress a reduction in strength of a portion of the weld portion 9 that is susceptible to stress concentration.

Particularly, when the electric storage device 1 or the bus bar 6 vibrates, or the electric storage device 1 is displaced with respect to its adjacent electric storage device 1 due to the influence of production errors, etc., stress occurs in the bus bar 6. In this case, strong stress may sometimes occur at the boundary between one of the connection portions 8 and the body 7, or at the boundary between the other of the connection portions 8 and the body 7. However, since the blowholes B that have occurred in a portion of the weld portion 9 on the body 7 side of the bus bar 6 where strong stress may possibly occur are eliminated, the stiffness of the connection between the external terminal 4 and the bus bar 6 can be ensured more reliably.

In the case where the first weld portion 90 is formed to have an elliptical ring shape, external forces may sometimes act on the bus bar in various directions, in the same manner as in the case of having a circular ring shape. Also in this case, it is possible to suppress stress concentration on the weld portion 9 in the same manner as in the case of having a circular ring shape. Accordingly, it is possible to increase the strength of the weld portion 9.

Further, in the above described embodiments, the second weld portion 91 is formed to have a circular ring shape. However, there is no limitation to this. For example, the second weld portion 91 is not required to have a circular ring shape as long as it overlaps a portion of the first weld portion 90 on the body 7 side of the bus bar 6.

Figure 10:
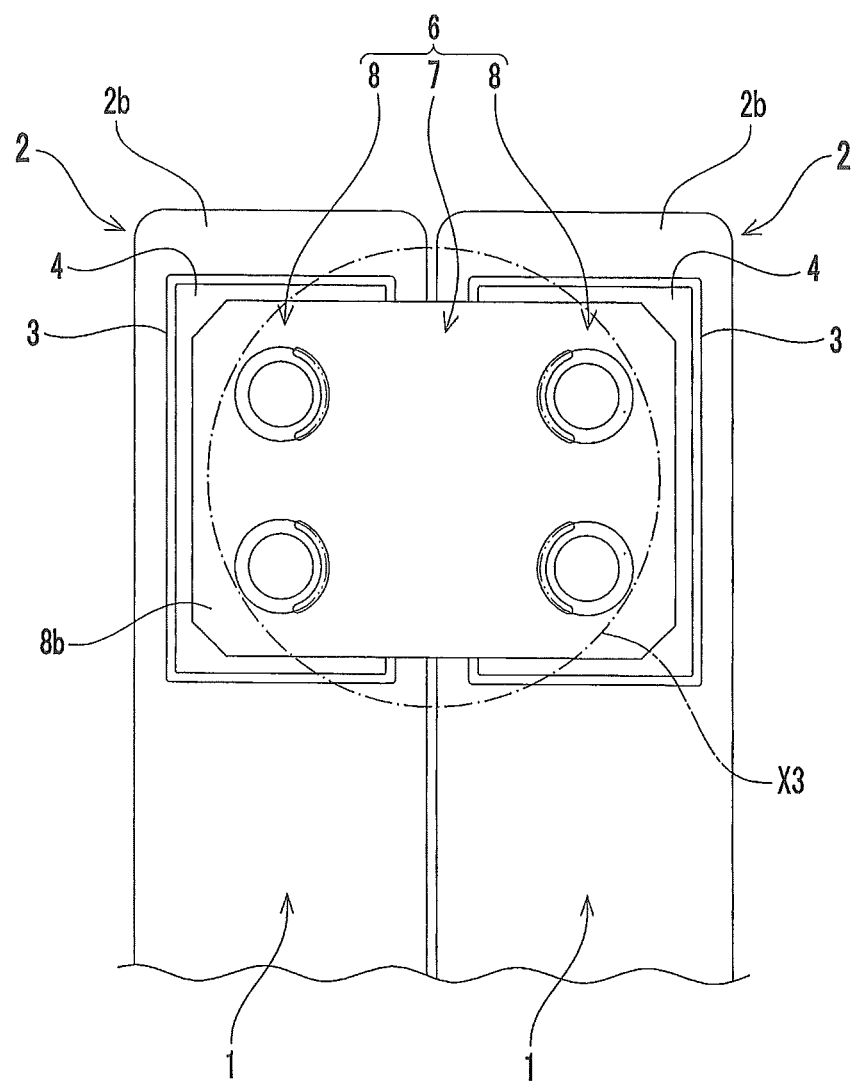
FIG. 10 is an enlarged plan view of a part of a battery module according to still another embodiment of the present invention.
Figure 11:
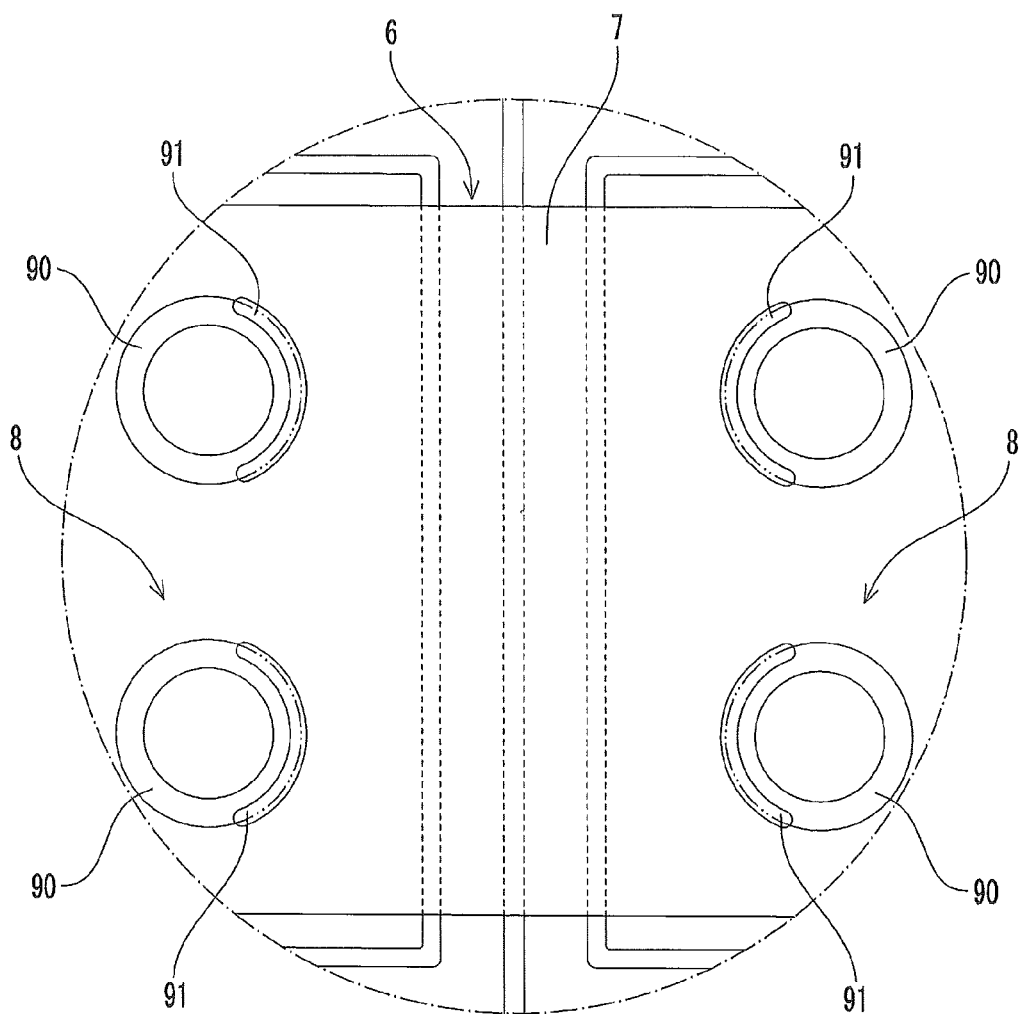
FIG. 11 is an enlarged view of a region X3 shown in FIG. 10.

More specifically, the second weld portion 91 may be formed to have an arcuate shape, for example, as shown in FIG. 10 and FIG. 11. Also in this case, it is preferable that the second weld portion 91 overlap a portion of the first weld portion 90 on the body 7 side of the bus bar 6.

This makes it possible to eliminate the blowholes B that have occurred in a portion of the weld portion 9 that is susceptible to stress concentration. Accordingly, it is possible to suppress a reduction in strength of the portion of the weld portion 9 that is susceptible to stress concentration.

In particular, when the electric storage device 1 or the bus bar 6 vibrates, or the electric storage device 1 is displaced with respect to its adjacent electric storage device 1 due to the influence of production errors, etc., stress occurs in the bus bar 6. In this case, strong stress may sometimes occur at the boundary between one of the connection portions 8 and the body 7, or at the boundary between the other of the connection portions 8 and the body 7. However, since the blowholes B that have occurred in a portion of the weld portion 9 on the body 7 side of the bus bar 6 where strong stress may possibly occur are eliminated, it is possible to suppress stress concentration on the weld portion 9. Accordingly, it is possible to ensure the stiffness of the connection between the external terminal 4 and the bus bar 6 more reliably.

Further, in the above described embodiments, the weld center of the second weld portion 91 is formed in a portion that is located at a distance equivalent to half of the junction width of the first weld portion 90 and that is displaced from the weld center of the first weld portion 90 outwardly in the radial direction. However, there is no limitation to this. For example, the distance that the weld center of the second weld portion 91 is displaced is not required to be the distance equivalent to half of the junction width of the first weld portion 90, as long as it is possible to eliminate the blowholes B that have occurred in a portion of the first weld portion 90 on the body 7 side of the bus bar 6.

What is claimed is:

1. An electric storage apparatus including a welding structure between an electric storage device and a bus bar, the electric storage apparatus comprising:
   the electric storage device including an external terminal that includes a first connection surface;
   the bus bar including a second connection surface that overlaps the first connection surface;
   a first weld portion that is formed extending over the external terminal and the bus bar in a region where the first connection surface and the second connection surface are opposed to each other; and
   a second weld portion that is formed extending over the external terminal and the bus bar in the region where the first connection surface and the second connection surface are opposed to each other, the second weld portion directly overlapping the first weld portion in a region where the first connection surface and the second connection surface overlap each other,
   wherein the second weld portion is formed such that a weld center of the second weld portion is displaced from a weld center of the first weld portion.

2. The electric storage apparatus according to claim 1, wherein the second weld portion is formed such that a penetration depth of the second weld portion is smaller than a penetration depth of the first weld portion.

3. The electric storage apparatus according to claim 1, wherein the first weld portion is formed to have an elliptical ring shape or a circular ring shape.

4. The electric storage apparatus according to claim 3, wherein the second weld portion is formed such that a weld center of the second weld portion is displaced from the weld center of the first weld portion outwardly in a radial direction of the first weld portion.

5. The electric storage apparatus according to claim 1, wherein the bus bar includes a connection portion that includes the second connection surface, and a body that is continuous with the connection portion, and
wherein the second weld portion is formed to overlap a portion of the first weld portion on a body side of the bus bar.

6. The electric storage apparatus according to claim 1, wherein the second weld portion is formed such that a weld center of the second weld portion is displaced in a direction intersecting a direction in which the first weld portion extends.

7. The electric storage apparatus according to claim 1, wherein a joining region of the first weld portion where the external terminal and the bus bar are joined together, and a joining region of the second weld portion where the external terminal and the bus bar are joined together are formed side by side to be in contact with each other in the region where the first connection surface and the second connection surface overlap each other.

8. The electric storage apparatus according to claim 1, wherein a distance between the weld center of the first weld portion and the weld center of the second weld portion is equivalent to a distance between the weld center of the first weld portion and an outer edge of the first weld portion formed on an opposite side of the second weld portion relative to the weld center of the first weld portion.

9. The electric storage apparatus according to claim 1, wherein, in a cross-sectional view in the width direction of the electric storage device, the second weld portion directly overlaps the first weld portion.

10. The electric storage apparatus according to claim 9, wherein the width direction of the electric storage device is perpendicular to a longitudinal direction of the electric storage device and further is perpendicular to a direction that the external terminal protrudes from of the electric storage device.

11. A method for welding an electric storage device and a bus bar together, the method :comprising:
overlapping a first connection surface of an external terminal included in the electric storage device with a second connection surface of the bus bar;
forming a first weld portion in which the external terminal and the bus bar are partially melted and fused, in a region where the first connection surface and the second connection surface are opposed to each other; and
forming a second weld portion in which the external terminal and the bus bar are melted and fused, in the region where the first connection surface and the second connection surface are opposed to each other, and in a region where the first connection surface and the second connection surface overlap each other, so as to have the second weld portion directly overlapping the first weld portion, such that a weld center of the second weld portion is displaced from a weld center of the first weld portion.

12. The method for welding the electric storage device and the bus bar together according to claim 11, wherein, in forming the second weld portion, the second weld portion is formed such that a penetration depth of the second weld portion is smaller than a penetration depth of the first weld portion.

13. The method for welding the electric storage device and the bus bar together according to claim 11, wherein, in forming the first weld portion, the first weld portion is formed to have an elliptical ring shape or a circular ring shape.

14. The method for welding the electric storage device and the bus bar together according to claim 13, wherein, in forming the second weld portion, the second weld portion is formed at a position displaced outwardly in a radial direction of the first weld portion.

15. The method for welding the electric storage device and the bus bar together according to claim 11, wherein the bus bar includes a connection portion that includes the second connection surface, and a body that is continuous with the connection portion, and
wherein in forming the second weld portion, the second weld portion is formed to overlap a portion of the first weld portion on a body side of the bus bar.

16. The method for welding the electric storage device and the bus bar together according to claim 11, wherein, in forming the second weld portion, the second weld portion is formed at a position displaced in a direction intersecting a direction in which the first weld portion extends.

17. The method for welding the electric storage device and the bus bar together according to claim 11, wherein, in forming the second weld portion, the second weld portion is formed to include a joining region of the second weld portion where the external terminal and the bus bar are joined together directly overlapping a joining region of the first weld portion where the external terminal and the bus bar are joined together.

18. The method for welding the electric storage device and the bus bar together according to claim 11, wherein, in forming the second weld portion, the second weld portion is formed so that the weld center of the second weld portion is displaced from the weld center of the first weld portion by a distance equivalent to a half of a joining width of the first weld portion where the external terminal and the bus bar are welded together.

19. The method for welding the electric storage device and the bus bar together according to claim 11, wherein, in a cross-sectional view in the width direction of the electric storage device, the second weld portion directly overlaps the first weld portion.

20. The method for welding the electric storage device and the bus bar together according to claim 19, wherein the width direction of the electric storage device is perpendicular to a longitudinal direction of the electric storage device and further is perpendicular to a direction that the external terminal protrudes from of the electric storage device.

* * * * *